(12) United States Patent
Sample et al.

(10) Patent No.: US 12,424,067 B2
(45) Date of Patent: Sep. 23, 2025

(54) SYSTEMS AND METHODS FOR A MAP-BASED MULTI-CAMERA VIEW DASHBOARD

(71) Applicant: Tyco Fire & Security GmbH, Neuhausen am Rheinfall (CH)

(72) Inventors: Benjamin Sample, Milwaukee, WI (US); Adam Sandler, Milwaukee, WI (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 110 days.

(21) Appl. No.: 18/194,292

(22) Filed: Mar. 31, 2023

(65) Prior Publication Data

US 2024/0331516 A1    Oct. 3, 2024

(51) Int. Cl.
*G08B 13/196* (2006.01)

(52) U.S. Cl.
CPC . *G08B 13/19693* (2013.01); *G08B 13/19682* (2013.01)

(58) Field of Classification Search
CPC .......... G08B 13/19693; G08B 13/1968; G08B 13/19682; G06F 3/0482; G06F 3/0488; G06F 3/04817
See application file for complete search history.

(56) References Cited

U.S. PATENT DOCUMENTS

| | | | |
|---|---|---|---|
| 8,990,691 B2 | 3/2015 | Matas et al. | |
| 9,212,927 B2 | 12/2015 | Stroila | |
| 10,185,465 B1 * | 1/2019 | Capano | G06F 21/552 |
| 10,750,346 B1 * | 8/2020 | Di Domenico | G06F 3/0481 |
| 2008/0088706 A1 * | 4/2008 | Girgensohn | H04N 7/181 |
| | | | 348/207.99 |
| 2015/0277746 A1 | 10/2015 | Wu | |
| 2017/0185277 A1 * | 6/2017 | Sundermeyer | G06F 3/04883 |
| 2018/0033153 A1 | 2/2018 | Hirasawa et al. | |
| 2021/0216789 A1 * | 7/2021 | Oami | G06T 7/292 |

FOREIGN PATENT DOCUMENTS

WO        2014182898 A1    11/2014

OTHER PUBLICATIONS

Kartaview, Website and App, 2020, [retrieved from the Internet on Feb. 12, 2023]. Retrieved from the Internet: URL: https://kartaview.org/landing>, 3 pages.
Mapillary, Website and App, 2013, [retrieved from the Internet on Feb. 12, 2023]. Retrieved from the Internet: <URL: https://www.mapillary.com/, 5 pages.
Extended European Search Report for EP Patent Application No. 24168154.3, mailed Jul. 26, 2024 (9 pages).

* cited by examiner

*Primary Examiner* — Mirza F Alam
(74) *Attorney, Agent, or Firm* — ArentFox Schiff LLP

(57) ABSTRACT

Example implementations include a method, apparatus and computer-readable medium for controlling multi-camera view user interface, comprising generating, for a graphical user interface, a respective camera window for each respective camera of the plurality of cameras in different areas of an environment, wherein the respective camera window outputs a stream captured by the respective camera. The implementations further include arranging the graphical user interface according to a camera window placement scheme based on a layout of the environment. Additionally, the implementations further include generating, for display, a dashboard comprising the graphical user interface organized according to the camera window placement scheme.

22 Claims, 12 Drawing Sheets

Fig. 4  Camera Window 302  Security Information 402  Camera Window 404

Heat Map Indicator 502

800

802 — Generating, for a graphical user interface, a respective camera window for each respective camera of the plurality of cameras in different areas of an environment, wherein the respective camera window outputs a stream captured by the respective camera 804 — Arranging the graphical user interface according to a camera window placement scheme based on a layout of the environment, wherein arranging the graphical user interface comprises assigning a first camera window of a first camera of the plurality of cameras a position on the graphical user interface relative to other generated camera windows based on a physical position of an area in the environment associated with the first camera relative to other areas in the environment 806 — Generating, for display, a dashboard comprising the graphical user interface organized according to the camera window placement scheme

Fig. 8

SYSTEMS AND METHODS FOR A MAP-BASED MULTI-CAMERA VIEW DASHBOARD

TECHNICAL FIELD

The described aspects relate to security camera systems, and more particularly, to a map-based multi-camera dashboard.

BACKGROUND

Conventional security systems that present streams captured by multiple cameras typically have a grid-like user interface. Each window of the user interface depicts a camera view and has the same window size. When security personnel such as officers monitor streams on such user interfaces, they are unable to immediately identify the windows showing the most important information. Security personnel also cannot easily identify where the cameras are positioned relative to one another by simply viewing the user interface. As a result, there is a delay to address and remediate potential security issues that arise in the monitored environment.

There thus exists a need to improve such user interfaces of security systems.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example aspect includes a method for controlling a multi-camera view user interface, comprising generating, for a graphical user interface, a respective camera window for each respective camera of the plurality of cameras in different areas of an environment, wherein the respective camera window outputs a stream captured by the respective camera. The method further includes arranging the graphical user interface according to a camera window placement scheme based on a layout of the environment, wherein arranging the graphical user interface comprises assigning a first camera window of a first camera of the plurality of cameras a position on the graphical user interface relative to other generated camera windows based on a physical position of an area in the environment associated with the first camera relative to other areas in the environment. Additionally, the method further includes generating, for display, a dashboard comprising the graphical user interface organized according to the camera window placement scheme.

Another example aspect includes an apparatus for controlling a multi-camera view user interface, comprising a memory and a processor coupled with the memory. The processor is configured to generate, for a graphical user interface, a respective camera window for each respective camera of the plurality of cameras in different areas of an environment, wherein the respective camera window outputs a stream captured by the respective camera. The processor is further configured to arrange the graphical user interface according to a camera window placement scheme based on a layout of the environment, wherein arranging the graphical user interface comprises assigning a first camera window of a first camera of the plurality of cameras a position on the graphical user interface relative to other generated camera windows based on a physical position of an area in the environment associated with the first camera relative to other areas in the environment. Additionally, the processor further configured to generate, for display, a dashboard comprising the graphical user interface organized according to the camera window placement scheme.

Another example aspect includes an apparatus for controlling a multi-camera view user interface, comprising means for generating, for a graphical user interface, a respective camera window for each respective camera of the plurality of cameras in different areas of an environment, wherein the respective camera window outputs a stream captured by the respective camera. The apparatus further includes means for arranging the graphical user interface according to a camera window placement scheme based on a layout of the environment, wherein arranging the graphical user interface comprises assigning a first camera window of a first camera of the plurality of cameras a position on the graphical user interface relative to other generated camera windows based on a physical position of an area in the environment associated with the first camera relative to other areas in the environment. Additionally, the apparatus further includes means for generating, for display, a dashboard comprising the graphical user interface organized according to the camera window placement scheme.

Another example aspect includes a computer-readable medium having instructions stored thereon for controlling a multi-camera view user interface, wherein the instructions are executable by a processor to generate, for a graphical user interface, a respective camera window for each respective camera of the plurality of cameras in different areas of an environment, wherein the respective camera window outputs a stream captured by the respective camera. The instructions are further executable to arrange the graphical user interface according to a camera window placement scheme based on a layout of the environment, wherein arranging the graphical user interface comprises assigning a first camera window of a first camera of the plurality of cameras a position on the graphical user interface relative to other generated camera windows based on a physical position of an area in the environment associated with the first camera relative to other areas in the environment. Additionally, the instructions are further executable to generate, for display, a dashboard comprising the graphical user interface organized according to the camera window placement scheme.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, wherein dashed lines may indicate optional elements, and in which:

FIG. 8 is a flowchart of an example of a method for controlling multi-camera view user interface;

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The present disclosure includes apparatuses and methods for generating and controlling a map-based multi-camera dashboard. More specifically, the multi-camera dashboard described herein is operative to position and size camera windows based on where the cameras are installed and their field of view, respectfully. Camera windows may additionally show other security information such as the amount of people in a given area of an environment, whether the doors of the area are open/closed/locked, the devices in the area, etc. Because the camera windows are relatively positioned on dashboard user interface based on their real-life positions, security personnel can immediately determine where security events are happening. Furthermore, in one or more aspects, as security events begin accumulating in certain areas, a visual indicator of such increased activity, such as but not limited to a heat map, is generated on the dashboard to improve identification of the areas with the most need for attention.

Figure 1:
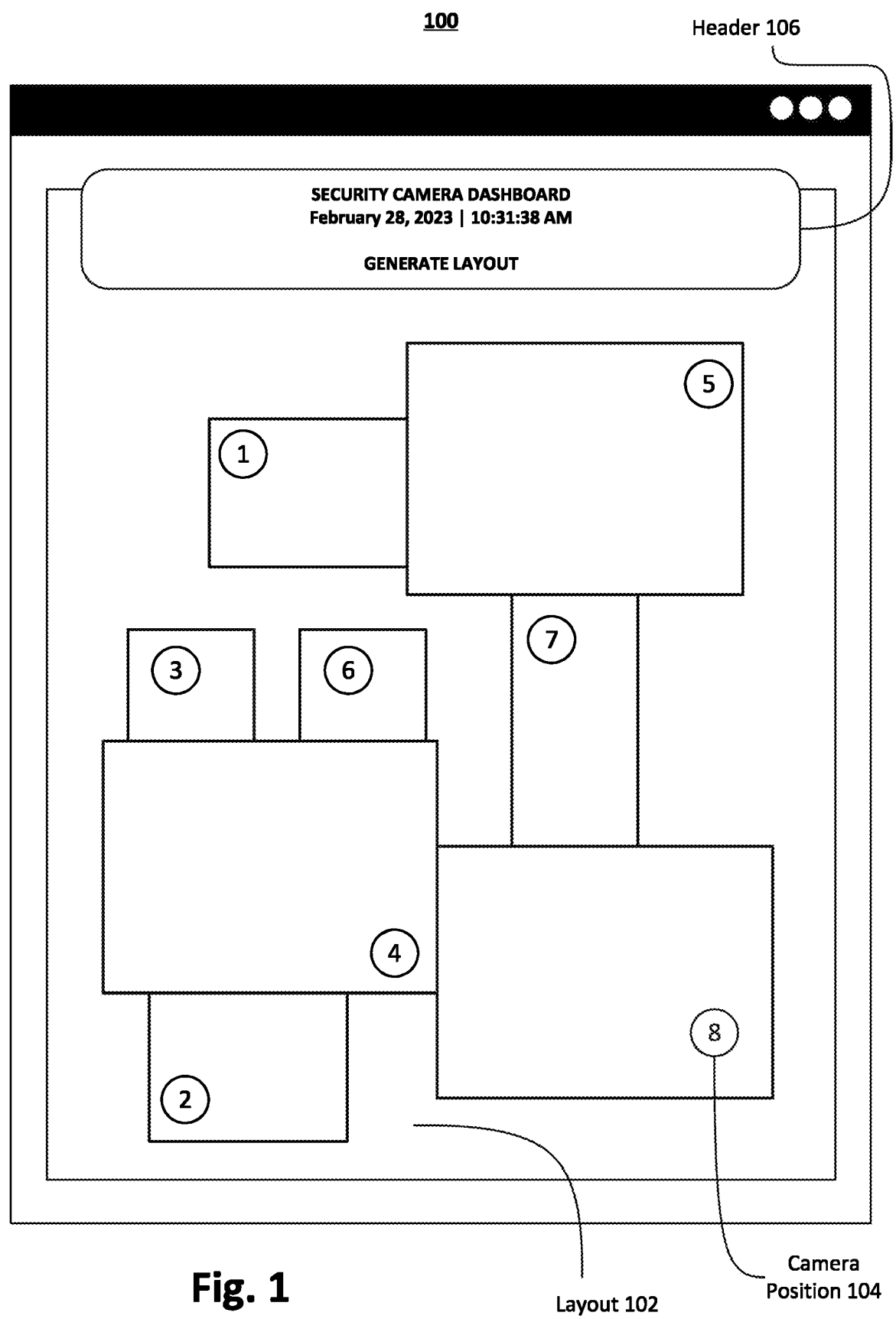
FIG. 1 is a diagram of an example of a user interface requesting a layout.

FIG. 1 is a diagram 100 of an example of a user interface requesting a layout for use in a map-based multi-camera dashboard. The user interface is generated by a user interface component (described in FIG. 7). In diagram 100, the user interface requests an environment layout. The user may draw layout 102 on the user interface or upload an image, graphic, or any other data representing the layout 102 (e.g., of a floorplan). The user may then mark the locations of cameras, which may also be referred to as or be associated with a camera placement scheme, in layout 102. As used herein, a camera placement scheme refers to a relative location of a plurality of camera within the layout 102, where the relative location may be defined by areas in the layout 102, geographic location information, and/or any other data suitable to indicate a relative position of each camera. For example, camera position 104 is the position of a camera identified as camera number "8." In some aspects, marking a location is performed by selecting an area in the layout. Accordingly, the user interface component may generate a marker in the selected area. In some aspects, the marker is a visual icon that may include and/or otherwise represent or indicate a camera identifier. For example, the camera identifier may any combination of characters that are unique to the camera (e.g., a number, a letter, a name, a MAC address, or any combination thereof, etc.). In diagram 100, the camera identifier is a number between 1 and 9. For example, a camera with the identifier "8" has a marker of a circle with the number 8 inside.

In some aspects, the user interface may include header 106, which provides information such as time, location, and provides options such as "camera settings," "view editor," etc. Header 106 may also include information about what the user is looking at. For example, in FIG. 1, header 106 indicates that a layout is being generated.

Figure 2:
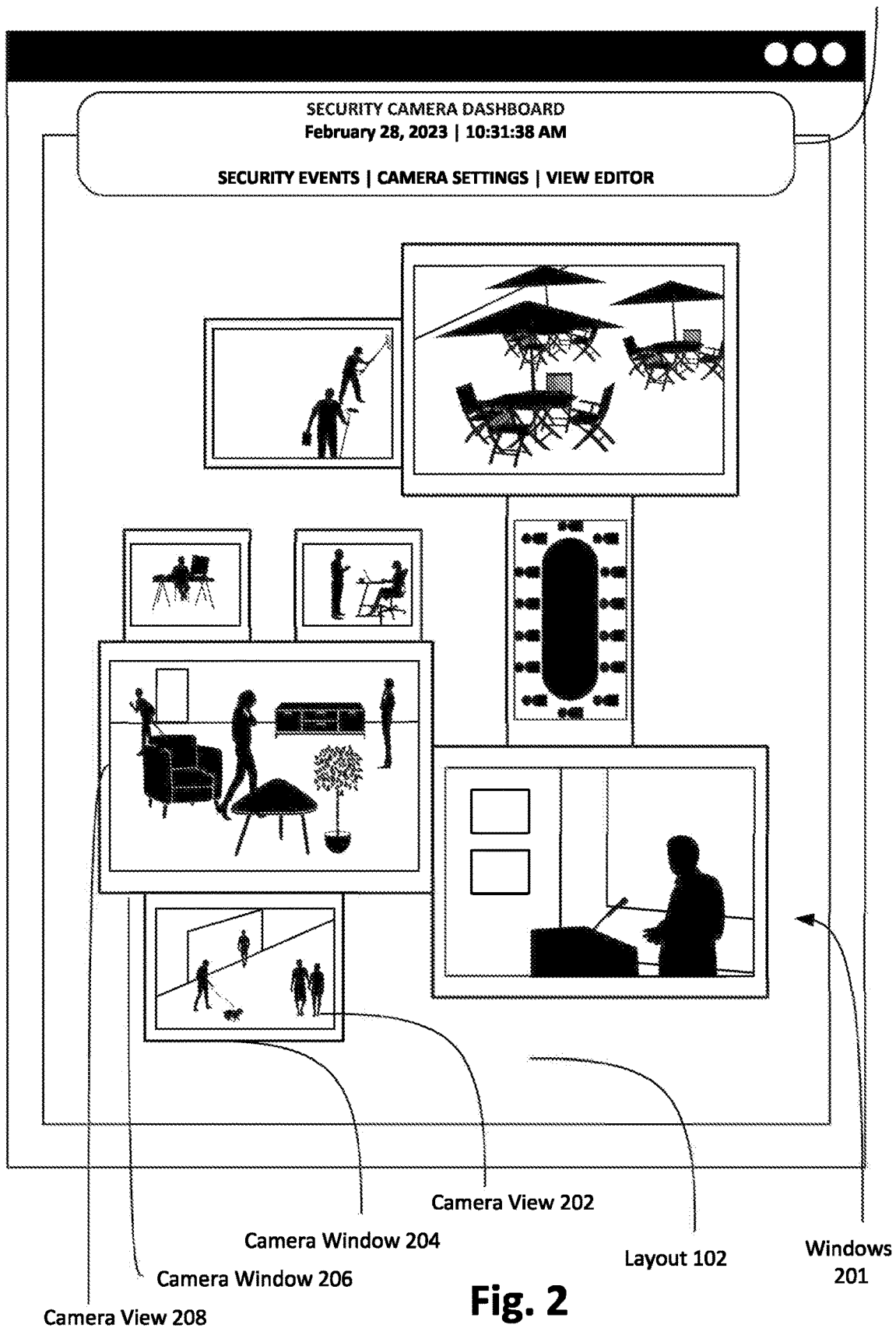
FIG. 2 is a diagram of an example of a user interface displaying a plurality of camera views simultaneously in accordance with a camera placement scheme.

FIG. 2 is a diagram 200 of an example of a user interface displaying a plurality of camera views simultaneously in accordance with a camera placement scheme and a layout 102. Suppose that the environment is an office building. Layout 102 may be a floorplan of the first floor. The user interface component may generate a layout for each floor simultaneously, but for simplicity, suppose that only one floor is shown in FIGS. 1-6.

The user interface component may receive a video feed from each camera in the environment associated with the layout 102 and generate respective camera windows 201 on the user interface to display the respective video feeds. Unlike conventional security systems, however, the camera windows are not simply arranged in a generic grid-like manner. Instead, the user interface component arranges the user interface according to a camera window placement scheme based on a layout of the environment. More specifically, the user interface component assigns a respective camera window of each camera a position on the user interface relative to other generated camera windows based on a physical position of an area in the environment associated with each camera relative to other areas in the environment. For example, FIG. 2 depicts a plurality of camera windows such as camera window 204 relative to camera window 206 and a plurality of camera views within the windows such as camera view 202 and camera view 208, respectively. The location of each of the plurality of camera windows is based on camera placement scheme, e.g., based on at least a location of each respective area. For example, and additionally referring to FIG. 1, the location of the area associated with camera 2 is below the location of the area associated with camera 4 (and to the left of the area associated with camera 8). Consequently, the user interface component arranges the user interface such that the camera window 204 associated with camera 2 is displayed, in the layout 102, below the camera window 206 associated with camera 4 (and to the left of the respective camera window associated with camera 8). In other words, the camera windows 201 are arranged such that each respective camera window is in a same relative position as the corresponding area in the layout 102. In some alternative or additional aspects, a size of each of the camera windows may be additionally based on a size of the area within which a respective camera is located. For example, and additionally referring to FIG. 1, the area where camera 2 is installed is a room, and the visual size of camera window 204 is proportional to the physical size of said room relative to the sizes of other areas in the layout 102.

Figure 3:
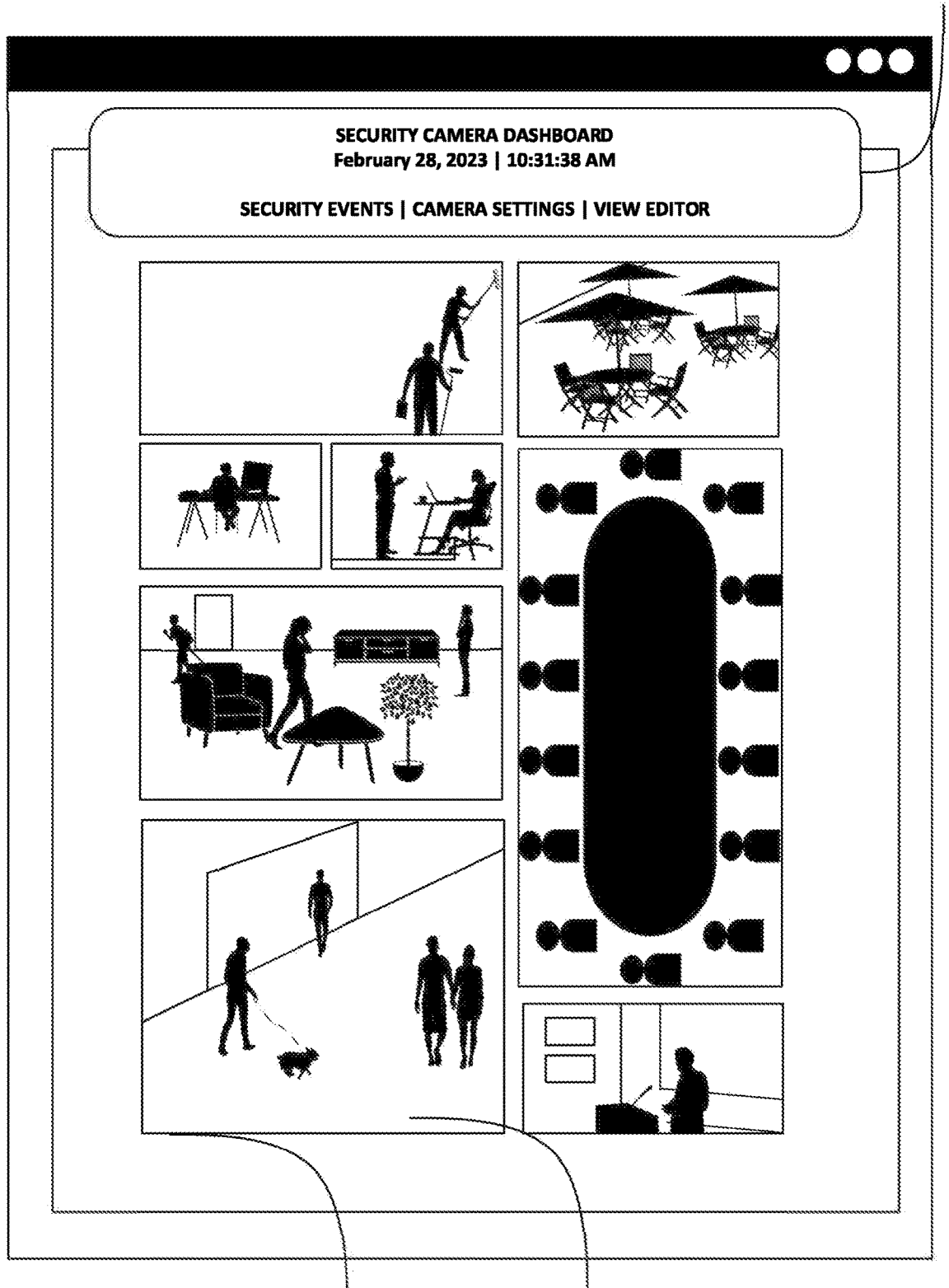
FIG. 3 is a diagram of an example of a user interface displaying a plurality of camera views simultaneously in accordance with another camera placement scheme.

FIG. 3 is a diagram 300 of an example of a user interface displaying a plurality of camera views simultaneously in accordance with another camera placement scheme. In diagram 300, the user interface component arranges each of the camera windows and sizes them based on a size of the area captured by the camera. The arrangement of the cameras is a dynamic grid where each camera window is still positioned based on the location of the camera in the environment relative to one another, albeit in a collapsed manner so that the space between each camera window is even. In some aspects, the size of the area captured by the camera is estimated based on the size of an object captured within the frame. For example, the object may be a person. The user interface may resize each camera window such that the size of a detected person is within a threshold size window. For example, the threshold size window may be 15-40 pixels. For cameras that capture a large area such as a conference room, the camera window will be larger as compared to camera windows for cameras that capture small spaces such as a single office room. In FIG. 3, the plurality of camera windows are sized such that all persons are within the threshold size window. Accordingly, each person is at least 15 pixels tall and at most 40 pixels tall. In order to achieve this balance, the user interface component arranges the conference room view (an oval with 14 persons) to have a larger camera window compared to, for example, camera window 302 featuring camera view 202 or the other camera windows where the cameras are physically located closer to persons.

Figure 4:
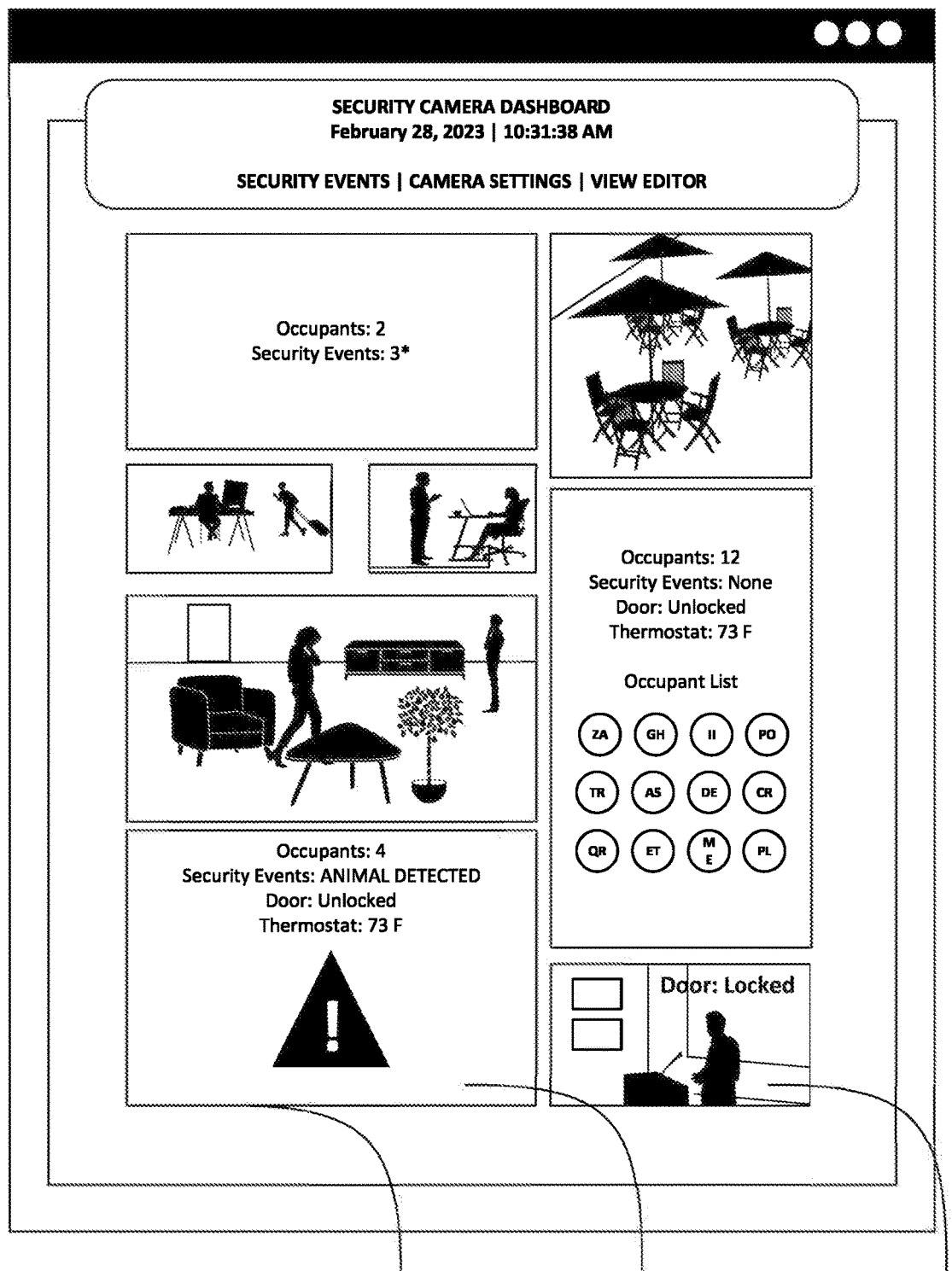
FIG. 4 is a diagram of an example of a user interface displaying a plurality of camera views and security information simultaneously in accordance with a camera placement scheme.

FIG. 4 is a diagram 400 of an example of a user interface displaying a plurality of camera views and security information simultaneously in accordance with a camera placement scheme. In diagram 400, the user interface component generates security information within the camera windows. For example, camera window 302 includes security information 402 within camera view 202. In some aspects, the security information 402 may replace the actual feed as shown in camera window 302 or may be overlaid on the feed as shown in camera window 404.

This security information indicates that there are four occupants in the area, and an animal has been detected. Additional security information includes whether the doors are locked/unlocked, and device information in the area such as the temperature setting of a thermostat. The security information may also indicate the amount of security events that have occurred within a threshold time period (e.g., past hour, past day, etc.) and the list of occupants. For example, the occupants of the conference room are listed by initials in FIG. 4. A user may select the security information to gather more information about security events. For example, a user may select (e.g., by clicking or touching) an icon with the initials of an occupant to determine their full name, job title, etc.

In some aspects, when a security event is detected, the user interface component may automatically alert the user in the corresponding camera window. For example, camera window 302 originally showed camera view 202 (see FIG. 3). However, upon detection of a security event (e.g., the presence of an animal in the area), the user interface component displays security information 402 in camera window 302. A security event may be any predetermined attribute or occurrence associated with the environment that a user would like to gain information about. Examples of security events include fire detection, water detection, unauthorized access detection, forced door opening, detection of physical violence, theft detection, etc. For example, there may be one or more security sensors in a monitored environment that are operative to detect and generate such security events (e.g., a carbon monoxide detector may detect fires or smoke).

Figure 5:
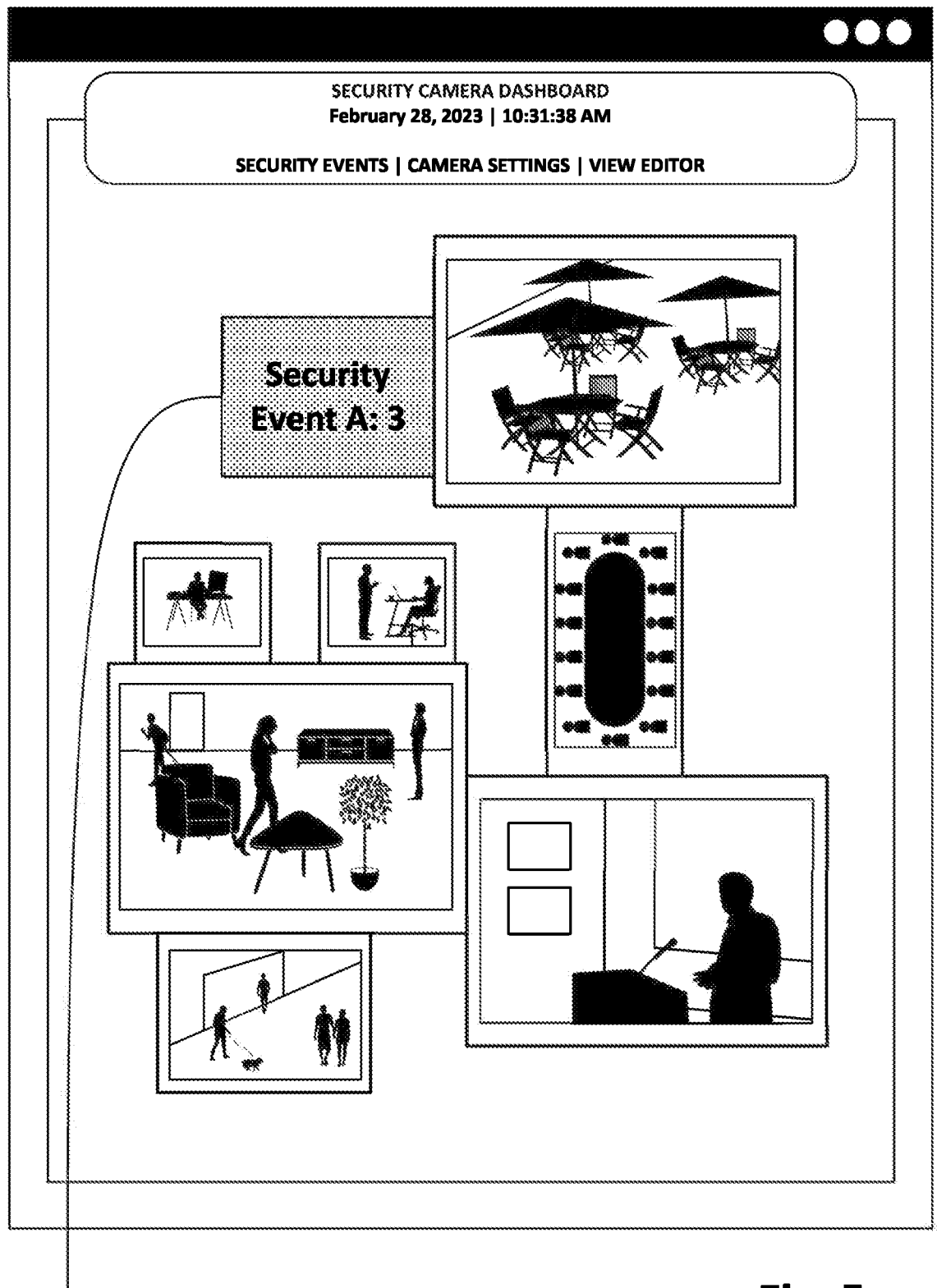
FIG. 5 is a diagram of an example of a user interface displaying a heat map based on security information in accordance with a camera placement scheme.

FIG. 5 is a diagram 500 of an example of a user interface displaying a high activity indication, such as but not limited to a heat map, based on security information in accordance with a camera placement scheme. In diagram 500, the camera placement scheme is the same as the scheme shown in FIG. 2. The additional feature depicted in diagram 500 is the inclusion of a high activity indication, referred to as a heat map indicator 502. The user interface component may track the amount of security events that have happened in a given area. In response to determining that the amount of security events is greater than a threshold amount, the user interface component may generate heat map indicator 502 to visually alert the user of increased security event activity in a given area. Heat map indicator 502 is a visual cue (e.g., a change in color of the window, a resized window, an increase in resolution of the view, etc.) that makes the camera view and/or security information for a particular area stand out in comparison to other camera views and/or security information on the user interface. In the example of FIG. 3, for instance, the heat map indicator 502 is shading or color applied to the camera window, and in this case the heat map indicator 502 additionally includes security event information, such as words or a code that may be associated with the security event (e.g., "Security Event A: 3" in this case, providing a count (e.g., "3") of the number of security events of type "A" that have occurred in the area). The security event information may be overlaid on a feed or may replace the feed.

Figure 6:
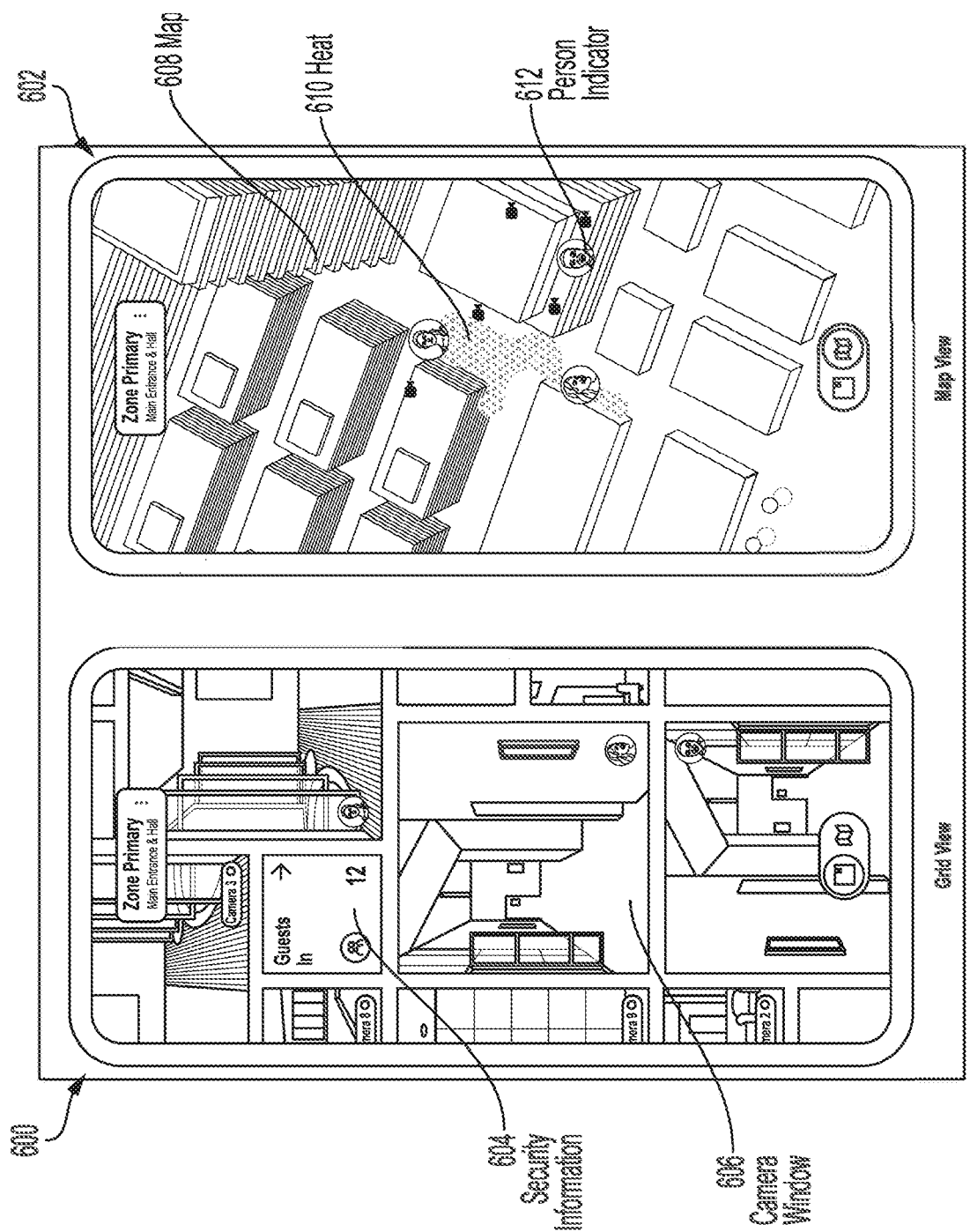
FIG. 6 is a diagram of an example of two user interfaces respectively displaying security information and a heat map in accordance with a camera placement scheme.

FIG. 6 is a diagram of an example of two user interfaces 600 and 602 respectively displaying security information and a heat map in accordance with a camera placement scheme. User interface 600 presents camera windows such as camera window 606 and security information such as security information 604 in a mobile view. Suppose that the environment in which the cameras are installed is a university campus with multiple buildings. User interface 600 depicts one type of view that includes the camera windows arranged according to a camera window placement scheme. User interface 602 depicts a different type of view in which a three-dimensional visual representation of the campus buildings is shown. This three-dimensional visual representation is another format in which the layout of an environment may be generated. For example, layout 102 in FIG. 1 represents a two-dimensional visual representation of the rooms in one building.

In an alternative or additional aspect, arranging the graphical user interface according to the camera window placement scheme is spatially variable relative to a user device in the environment presenting the dashboard based on location information and direction information associated with the user device. In some aspects, the computing device may use a combination of a global positioning system (GPS), inertial measurement unit (IMU), and computer vision to determine location and orientation. For example, based on an image captured in the direction that the camera is facing, localization techniques may be executed by user interface component to determine the direction.

For example, with respect to being spatially variable, the arrangement of the camera windows may change based on the position and the direction the computing device (e.g., the smartphone the user is accessing user interface 600 on) is facing. Suppose that a user is located in the area of the environment associated with camera window 606. When the computing device faces a first direction, the camera window include security information 604 may be situated above camera window 606 (as shown in user interface 600). However, if the computing device is moved 180 degrees to the opposite direction, the user interface component may rotate the camera windows relative to camera window 606 by 180 degrees. This would place the camera window including security information 604 to be below camera window 606 on the user interface. As the user moves around in the environment, the user interface component may rotate the camera windows about the camera window of the area that the user is currently in.

User interface 602 presents a layout user interface featuring a map 608 of the environment. Within the map are icons indicating the location of cameras and persons (e.g., person indicator 612). Heat 610 identifies the area in map 608 where at least a threshold number of security events have occurred within a period of time. For example, heat 610 may be a colored portion of map 608 and is a visual cue for the user to focus their attention on.

Figure 7:
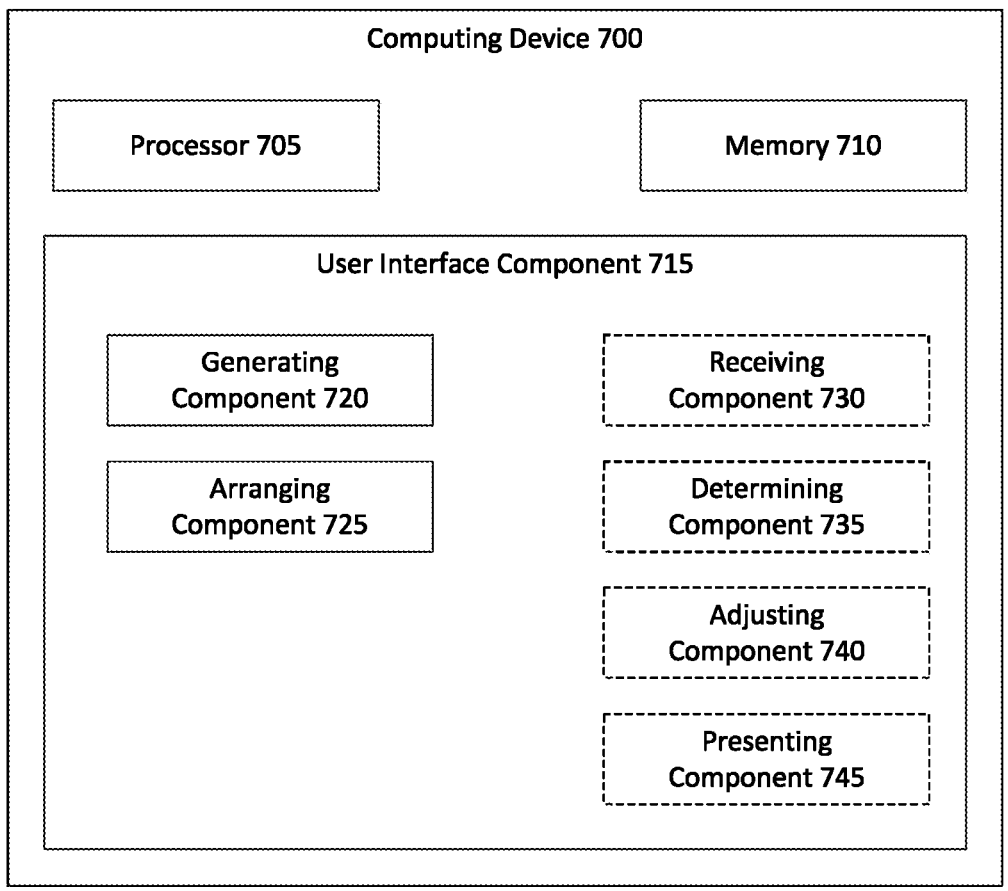
FIG. 7 is a block diagram of an example of a computer device having components configured to perform a method for controlling multi-camera view user interface.

Referring to FIG. 7 and FIG. 8, in operation, computing device 700 may perform a method 800 for controlling a multi-camera view user interface, by such as via execution of user interface component 715 by processor 705 and/or memory 710.

At block 802, the method 800 includes generating, for a graphical user interface, a respective camera window for each respective camera of the plurality of cameras in different areas of an environment, wherein the respective camera window outputs a stream captured by the respective camera. For example, in an aspect, computing device 700, processor 705, memory 710, user interface component 715, and/or generating component 720 may be configured to or may comprise means for generating, for a graphical user interface, a respective camera window (e.g., camera window 204) for each respective camera of the plurality of cameras in different areas of an environment, wherein the respective camera window outputs a stream (e.g., camera view 202) captured by the respective camera.

At block 804, the method 800 includes arranging the graphical user interface according to a camera window placement scheme based on a layout of the environment, wherein arranging the graphical user interface comprises assigning a first camera window of a first camera of the plurality of cameras a position on the graphical user interface relative to other generated camera windows based on a physical position of an area in the environment associated with the first camera relative to other areas in the environment. For example, in an aspect, computing device 700, processor 705, memory 710, user interface component 715, and/or arranging component 725 may be configured to or may comprise means for arranging the graphical user interface according to a camera window placement scheme based on a layout of the environment, wherein arranging the graphical user interface comprises assigning a first camera window of a first camera of the plurality of cameras a position on the graphical user interface relative to other generated camera windows based on a physical position of an area in the environment associated with the first camera relative to other areas in the environment.

For example, user interface component 715 may receive layout 102 of the environment and identify the locations of each camera (e.g., camera position 104). In some aspects, user interface component 715 may identify each area in layout 102. For example, an area may be a room, a hall, a foyer, etc. User interface component 715 may then create at least one camera window for each area depending on the amount of cameras within the area. Referring to FIG. 1, for example, camera 2 is located in a room of a given width and length in a given location relative to the other areas in layout 2. User interface component 715 generates camera window 204 for camera 2 and sets the size of the window proportionally based on the given width and length. In addition, the location of the camera window is assigned based on the given location of the room. User interface component 715 arranges the other camera windows in the same manner.

In some aspects, the end result is the user interface shown in FIG. 2, where the camera windows are sized and arranged to match layout 102. In some aspects, the user interface component 715 adjusts the resolution and aspect ratio of the video streams to fit within the camera window that houses the video stream. In some aspects, user interface component 715 adjusts the resolution and aspect ratio of the video streams such that they fill their corresponding camera windows.

In some aspects, the end result of the arrangement is the user interface shown in FIG. 3, where the space between the camera windows is equal, the size of the camera windows is based on the area captured by a camera, and the location of the camera window relative to the other camera windows is based on the location of the physical camera location relative to the other physical camera locations.

At block 806, the method 800 includes generating, for display, a dashboard comprising the graphical user interface organized according to the camera window placement scheme. For example, in an aspect, computing device 700, processor 705, memory 710, user interface component 715, and/or generating component 720 may be configured to or may comprise means for generating, for display, a dashboard comprising the graphical user interface organized according to the camera window placement scheme.

Figure 9:
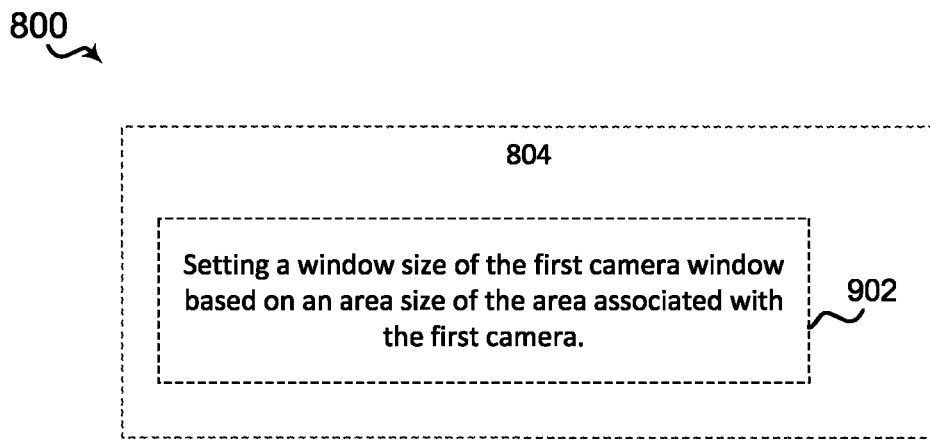
FIG. 9 is a flowchart of additional aspects of the method of FIG. 8.

Referring to FIG. 9, in an alternative or additional aspect, at block 902, the arranging at block 804 of the graphical user interface according to the camera window placement scheme further includes setting a window size of the first camera window based on an area size of the area associated with the first camera.

Consider an example with only two areas. The first area may be 15 feet by 15 feet in physical length and width. The second area may be 30 feet by 15 feet. Based on these dimensions, user interface component 715 may generate a first camera window that is 150 pixels by 150 pixels and a second camera window that is 300 pixels by 150 pixels for the first area and the second area, respectively.

In an alternative or additional aspect, a respective window size and a respective window position of each respective camera window is proportional to a respective area size and a respective area position of each area in the environment corresponding to each of the plurality of cameras.

For example, the first area may be adjacent to the second area such that together their form a rectangle that is 45 feet by 15 feet. Accordingly, user interface component 715 may place the first camera window adjacent to the second camera window such that the together they form a rectangle that is 450 pixels by 150 pixels.

Figure 10:
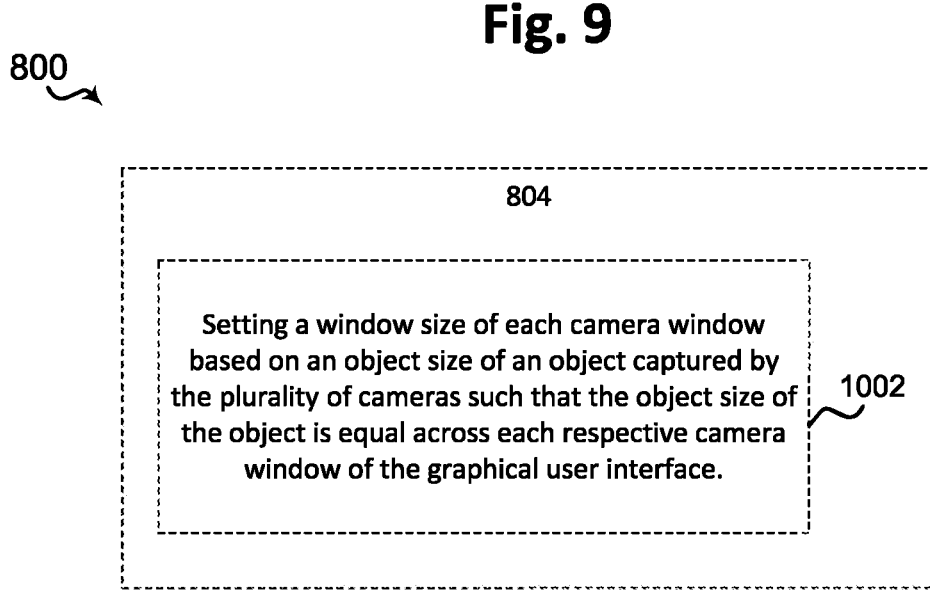
FIG. 10 is a flowchart of additional aspects of the method of FIG. 8.

Referring to FIG. 10, in an alternative or additional aspect, at block 1002, the arranging at block 804 of the graphical user interface according to the camera window placement scheme further includes setting a window size of each camera window based on an object size of an object captured by the plurality of cameras such that the object size of the object is equal across each respective camera window of the graphical user interface.

For example, an object may be a person. Suppose that the size of the object in a first camera window is 20 pixels in length. If a person appears in the second camera window, the user interface component may resize the second camera window to ensure that the size of the object in the second camera window is also 20 pixels in length. Because some objects are positioned farther away from a camera and appear smaller as a result, this allows for the object of interest that is being monitored to be the same throughout the user interface. For example, in FIG. 3, all of the camera windows are sized such that people are with the same threshold size. Thus, the view of the conference room with fourteen occupants is much larger than the view of a singular office focused on one person.

Figure 11:
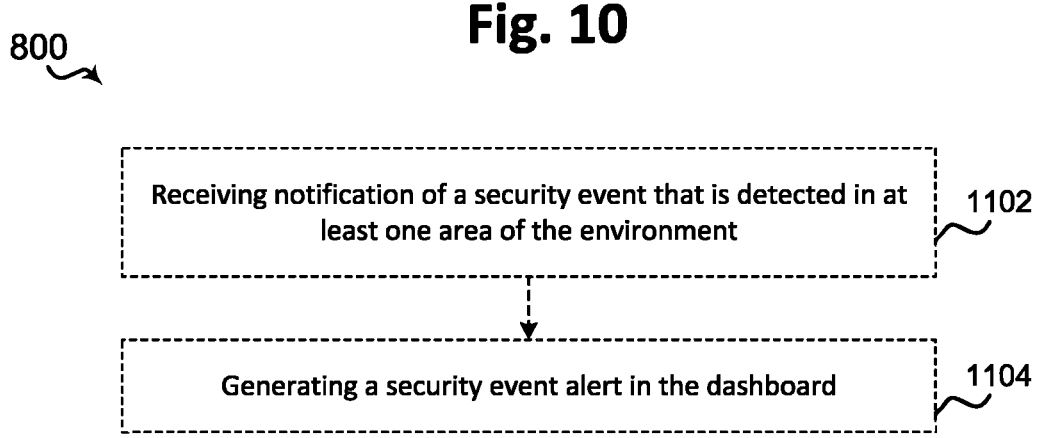
FIG. 11 is a flowchart of additional aspects of the method of FIG. 8.

Referring to FIG. 11, in an alternative or additional aspect, at block 1102, the method 800 may further include receiving notification of a security event that is detected in at least one area of the environment. For example, in an aspect, computing device 700, processor 705, memory 710, user interface component 715, and/or receiving component 730 may be configured to or may comprise means for receiving notification of a security event that is detected in at least one area of the environment. For example, referring to FIG. 4, the security event may indicate that an animal has entered the environment.

In this optional aspect, at block 1104, the method 800 may further include generating a security event alert in the dashboard. For example, in an aspect, computing device 700, processor 705, memory 710, user interface component 715, and/or generating component 720 may be configured to or may comprise means for generating a security event alert in the dashboard. For example, in FIG. 4, an alert is generated in camera window 302 indicating that the animal is detected.

In an alternative or additional aspect, generating the graphical user interface further comprises generating security event information in at least one respective camera window, the security information associated with a respective area in the environment associated with the respective camera window. In this aspect, the security event information comprises, for a given area, one or any combination of: an occupancy count, an occupancy indicator, a security personnel indicator, a security alert indicator, a security event history, a device count, or a device status list.

Figure 12:
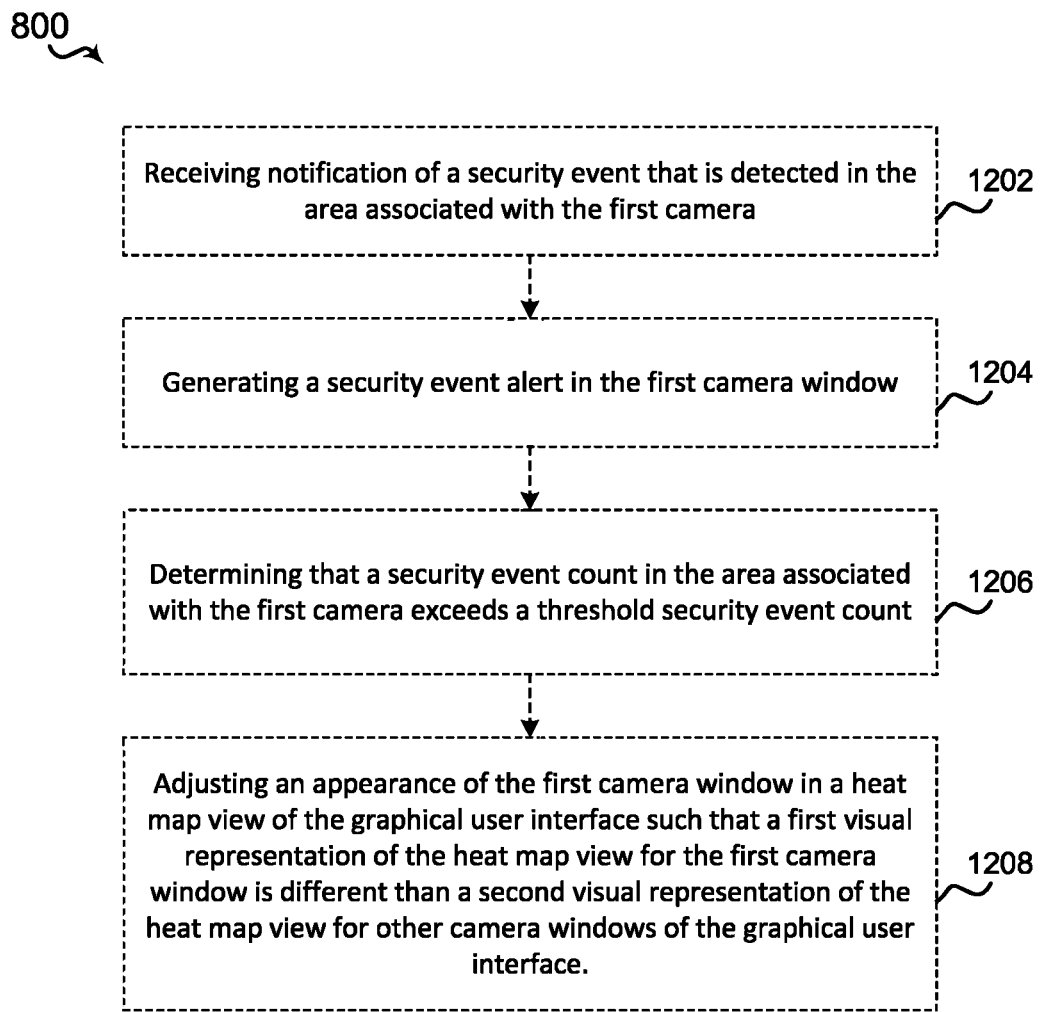
FIG. 12 is a flowchart of additional aspects of the method of FIG. 8.

Referring to FIG. 12, in an alternative or additional aspect, at block 1202, the method 800 may further include receiving notification of a security event that is detected in the area associated with the first camera. For example, in an aspect, computing device 700, processor 705, memory 710, user interface component 715, and/or receiving component 730 may be configured to or may comprise means for receiving notification of a security event that is detected in the area associated with the first camera.

In this optional aspect, at block 1204, the method 800 may further include generating a security event alert in the first camera window. For example, in an aspect, computing device 700, processor 705, memory 710, user interface component 715, and/or generating component 720 may be configured to or may comprise means for generating a security event alert in the first camera window (e.g., as shown in camera window 302).

In this optional aspect, at block 1206, the method 800 may further include determining that a security event count in the area associated with the first camera exceeds a threshold security event count. For example, in an aspect, computing device 700, processor 705, memory 710, user interface component 715, and/or determining component 735 may be configured to or may comprise means for determining that a security event count (e.g., 3) in the area associated with the first camera exceeds a threshold security event count (e.g., 2) during a given period of time (e.g., 1 hour).

In this optional aspect, at block 1208, the method 800 may further include adjusting an appearance of the first camera window in a heat map view of the graphical user interface such that a first visual representation of the heat map view for the first camera window is different than a second visual representation of the heat map view for other camera windows of the graphical user interface, . . . For example, in an aspect, computing device 700, processor 705, memory 710, user interface component 715, and/or adjusting component 740 may be configured to or may comprise means for adjusting an appearance of the first camera window in a heat map view of the graphical user interface such that a first visual representation of the heat map view for the first camera window is different than a second visual representation of the heat map view for other camera windows of the graphical user interface. For example, user interface component 715 may change the color of the camera window as shown in heat map indicator 502 of FIG. 5.

Figure 13:
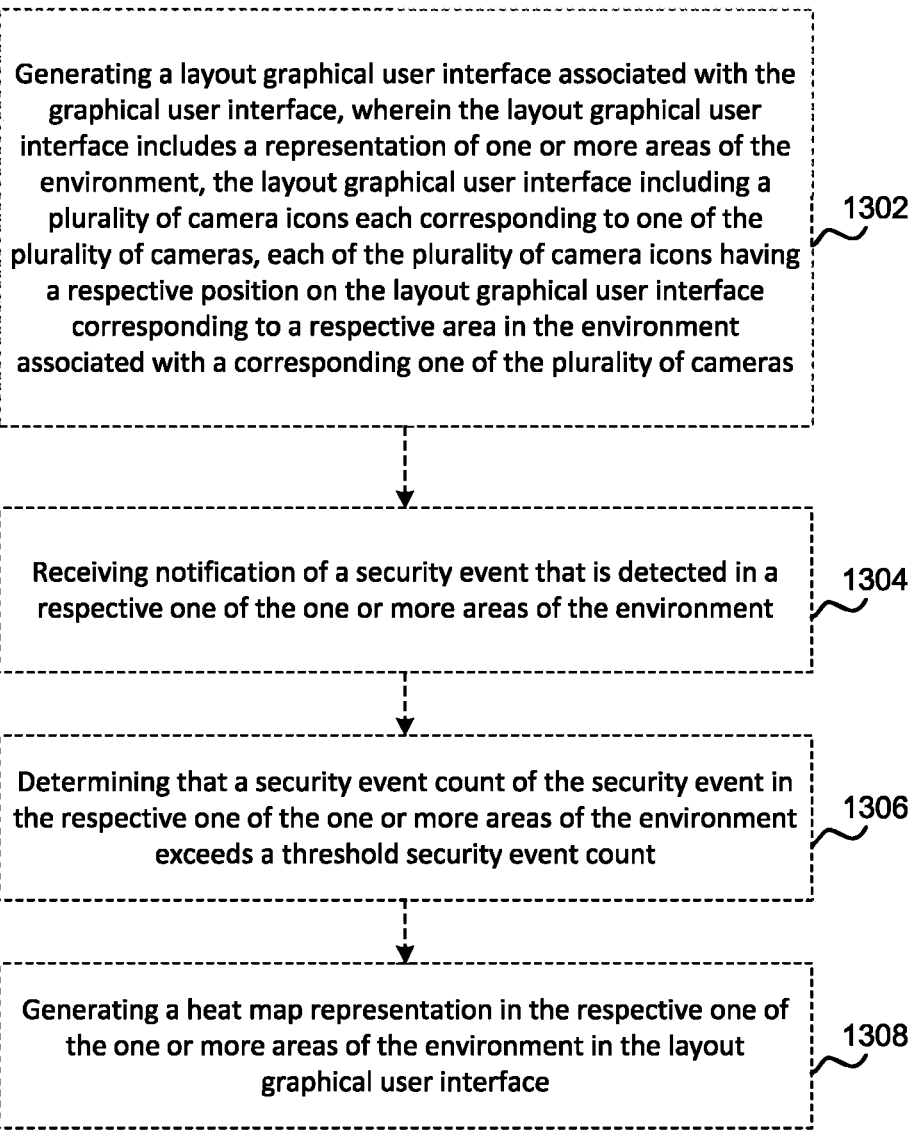
FIG. 13 is a flowchart of additional aspects of the method of FIG. 8.

Referring to FIG. 13, in an alternative or additional aspect, at block 1302, the method 800 may further include generating a layout graphical user interface associated with the graphical user interface, wherein the layout graphical user interface includes a representation of one or more areas of the environment, the layout graphical user interface including a plurality of camera icons each corresponding to one of the plurality of cameras, each of the plurality of camera icons having a respective position on the layout graphical user interface corresponding to a respective area in the environment associated with a corresponding one of the plurality of cameras. For example, in an aspect, computing device 700, processor 705, memory 710, user interface component 715, and/or generating component 720 may be configured to or may comprise means for generating a layout graphical user interface associated with the graphical user interface, wherein the layout graphical user interface includes a representation of one or more areas of the environment, the layout graphical user interface including a plurality of camera icons each corresponding to one of the plurality of cameras, each of the plurality of camera icons having a respective position on the layout graphical user interface corresponding to a respective area in the environment associated with a corresponding one of the plurality of cameras.

For example, the layout graphical user interface may correspond to user interface 602, which includes map 608. Map 608 further includes person and camera indicators that represent location information.

In this optional aspect, at block 1304, the method 800 may further include receiving notification of a security event that is detected in a respective one of the one or more areas of the environment. For example, in an aspect, computing device 700, processor 705, memory 710, user interface component 715, and/or receiving component 730 may be configured to or may comprise means for receiving notification of a security event that is detected in a respective one of the one or more areas of the environment.

In this optional aspect, at block 1306, the method 800 may further include determining that a security event count of the security event in the respective one of the one or more areas of the environment exceeds a threshold security event count. For example, in an aspect, computing device 700, processor 705, memory 710, user interface component 715, and/or determining component 735 may be configured to or may comprise means for determining that a security event count of the security event in the respective one of the one or more areas of the environment exceeds a threshold security event count.

In this optional aspect, at block 1308, the method 800 may further include generating a heat map representation in the respective one of the one or more areas of the environment in the layout graphical user interface. For example, in an aspect, computing device 700, processor 705, memory 710, user interface component 715, and/or generating component 720 may be configured to or may comprise means for generating a heat map representation in the respective one of the one or more areas of the environment in the layout graphical user interface.

For example, in the area where the security count exceeds the threshold security count, user interface component 715 may generate heat 610, which is a visual cue representing that the security count exceeds the threshold security count.

Figure 14:
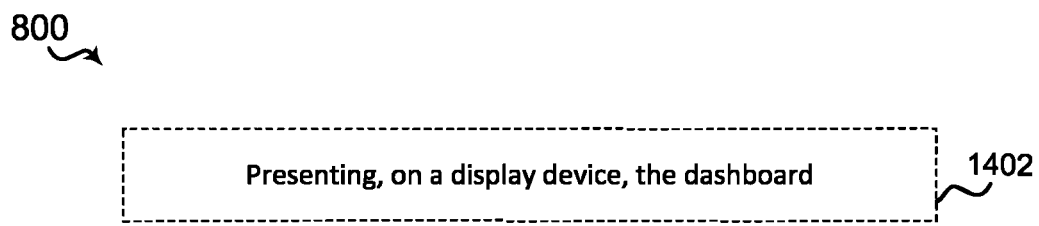
FIG. 14 is a flowchart of additional aspects of the method of FIG. 8.

Referring to FIG. 14, in an alternative or additional aspect, at block 1402, the method 800 may further include presenting, on a display device, the dashboard. For example, in an aspect, computing device 700, processor 705, memory 710, user interface component 715, and/or presenting, component 745 may be configured to or may comprise means for presenting, on a display device, the dashboard.

Additional aspects of the present disclosure may be implemented according to one or more of the following clauses.

Clause 1. An apparatus for controlling a multi-camera view user interface, comprising: a memory; and a processor coupled with the memory and configured to: generate, for a graphical user interface, a respective camera window for each respective camera of a plurality of cameras in different areas of an environment, wherein the respective camera window outputs a stream captured by the respective camera; arrange the graphical user interface according to a camera window placement scheme based on a layout of the environment, wherein to arrange the graphical user interface comprises to assign a first camera window of a first camera of the plurality of cameras a position on the graphical user interface relative to other generated camera windows based on a physical position of an area in the environment associated with the first camera relative to other areas in the environment; and generate, for display, a dashboard comprising the graphical user interface organized according to the camera window placement scheme.

Clause 2. The apparatus of any of the preceding clauses, wherein to arrange the graphical user interface according to the camera window placement scheme the processor is further configured to: set a window size of the first camera window based on an area size of the area associated with the first camera.

Clause 3. The apparatus of any of the preceding clauses, wherein a respective window size and a respective window position of each respective camera window is proportional to a respective area size and a respective area position of each area in the environment corresponding to each of the plurality of cameras.

Clause 4. The apparatus of any of the preceding clauses, wherein to arrange the graphical user interface according to the camera window placement scheme the processor is further configured to: set a window size of each camera window based on an object size of an object captured by the plurality of cameras such that the object size of the object is equal across each respective camera window of the graphical user interface.

Clause 5. The apparatus of any of the preceding clauses, wherein the processor is further configured to: receive notification of a security event that is detected in at least one area of the environment; and generate a security event alert in the dashboard.

Clause 6. The apparatus of any of the preceding clauses, wherein the processor is further configured to: receive notification of a security event that is detected in the area associated with the first camera; and generate a security event alert in the first camera window.

Clause 7. The apparatus of any of the preceding clauses, wherein the processor is further configured to: determine that a security event count in the area associated with the first camera exceeds a threshold security event count; and adjust an appearance of the first camera window in a heat map view of the graphical user interface such that a first visual representation of the heat map view for the first camera window is different than a second visual representation of the heat map view for other camera windows of the graphical user interface.

Clause 8. The apparatus of any of the preceding clauses, wherein the processor is further configured to: generate a layout graphical user interface associated with the graphical user interface, wherein the layout graphical user interface includes a representation of one or more areas of the environment, the layout graphical user interface including a plurality of camera icons each corresponding to one of the plurality of cameras, each of the plurality of camera icons having a respective position on the layout graphical user interface corresponding to a respective area in the environment associated with a corresponding one of the plurality of cameras; receive notification of a security event that is detected in a respective one of the one or more areas of the environment; determine that a security event count of the security event in the respective one of the one or more areas of the environment exceeds a threshold security event count; and generate a heat map representation in the respective one of the one or more areas of the environment in the layout graphical user interface.

Clause 9. The apparatus of any of the preceding clauses, wherein to generate the graphical user interface the processor is further configured to generate security event information in at least one respective camera window, the security information associated with a respective area in the environment associated with the respective camera window.

Clause 10. The apparatus of any of the preceding clauses, wherein the security event information comprises, for a given area, one or any combination of: an occupancy count, an occupancy indicator, a security personnel indicator, a security alert indicator, a security event history, a device count, or a device status list.

Clause 11. The apparatus of any of the preceding clauses, wherein the graphical user interface is spatially variable relative to a user device in the environment presenting the dashboard based on location information and direction information associated with the user device.

Clause 12. The apparatus of any of the preceding clauses, wherein the processor is further configured to present, on a display device, the dashboard.

Clause 13. A method for controlling multi-camera view user interface, comprising: generating, for a graphical user interface, a respective camera window for each respective camera of a plurality of cameras in different areas of an environment, wherein the respective camera window outputs a stream captured by the respective camera; arranging the graphical user interface according to a camera window placement scheme based on a layout of the environment, wherein arranging the graphical user interface comprises assigning a first camera window of a first camera of the plurality of cameras a position on the graphical user interface relative to other generated camera windows based on a physical position of an area in the environment associated with the first camera relative to other areas in the environment; and generating, for display, a dashboard comprising the graphical user interface organized according to the camera window placement scheme.

Clause 14. The method of any of the preceding clauses, wherein arranging the graphical user interface according to the camera window placement scheme further comprises: setting a window size of the first camera window based on an area size of the area associated with the first camera.

Clause 15. The method of any of the preceding clauses, wherein a respective window size and a respective window position of each respective camera window is proportional to a respective area size and a respective area position of each area in the environment corresponding to each of the plurality of cameras.

Clause 16. The method of any of the preceding clauses, wherein arranging the graphical user interface according to the camera window placement scheme further comprises: setting a window size of each camera window based on an object size of an object captured by the plurality of cameras such that the object size of the object is equal across each respective camera window of the graphical user interface.

Clause 17. The method of any of the preceding clauses, further comprising: receiving notification of a security event that is detected in at least one area of the environment; and generating a security event alert in the dashboard.

Clause 18. The method of any of the preceding clauses, further comprising: receiving notification of a security event that is detected in the area associated with the first camera; and generating a security event alert in the first camera window.

Clause 19. The method of any of the preceding clauses, further comprising: determining that a security event count in the area associated with the first camera exceeds a threshold security event count; and adjusting an appearance of the first camera window in a heat map view of the graphical user interface such that a first visual representation of the heat map view for the first camera window is different than a second visual representation of the heat map view for other camera windows of the graphical user interface.

Clause 20. The method of any of the preceding clauses, further comprising: generating a layout graphical user interface associated with the graphical user interface, wherein the layout graphical user interface includes a representation of one or more areas of the environment, the layout graphical user interface including a plurality of camera icons each corresponding to one of the plurality of cameras, each of the plurality of camera icons having a respective position on the layout graphical user interface corresponding to a respective area in the environment associated with a corresponding one of the plurality of cameras; receiving notification of a security event that is detected in a respective one of the one or more areas of the environment; determining that a security event count of the security event in the respective one of the one or more areas of the environment exceeds a threshold security event count; and generating a heat map representation in the respective one of the one or more areas of the environment in the layout graphical user interface.

Clause 21. The method of any of the preceding clauses, wherein generating the graphical user interface further comprises generating security event information in at least one respective camera window, the security information associated with a respective area in the environment associated with the respective camera window.

Clause 22. The method of any of the preceding clauses, wherein the security event information comprises, for a given area, one or any combination of: an occupancy count, an occupancy indicator, a security personnel indicator, a security alert indicator, a security event history, a device count, or a device status list.

Clause 23. The method of any of the preceding clauses, wherein arranging the graphical user interface according to the camera window placement scheme is spatially variable relative to a user device in the environment presenting the dashboard based on location information and direction information associated with the user device.

Clause 24. The method of any of the preceding clauses, further comprising presenting, on a display device, the dashboard.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. An apparatus for controlling a multi-camera view user interface, comprising:
   a memory; and
   a processor coupled with the memory and configured to:
      generate, for a graphical user interface, a respective camera window for each respective camera of a plurality of cameras in different areas of an environment, wherein the respective camera window outputs a stream captured by the respective camera;
      arrange the graphical user interface according to a camera window placement scheme based on a layout of the environment, wherein to arrange the graphical user interface comprises to:
         assign a first camera window of a first camera of the plurality of cameras a position on the graphical user interface relative to other generated camera windows based on a physical position of an area in the environment associated with the first camera relative to other areas in the environment; and
         set a window size of the first camera window based on an area size of the area associated with the first camera; and
      generate, for display, a dashboard comprising the graphical user interface organized according to the camera window placement scheme.

2. The apparatus of claim 1, wherein a respective window size and a respective window position of each respective camera window is proportional to a respective area size and a respective area position of each area in the environment corresponding to each of the plurality of cameras.

3. The apparatus of claim 1, wherein to arrange the graphical user interface according to the camera window placement scheme the processor is further configured to:
set a window size of each camera window based on an object size of an object captured by the plurality of cameras such that the object size of the object is equal across each respective camera window of the graphical user interface.

4. The apparatus of claim 1, wherein the processor is further configured to:
receive notification of a security event that is detected in at least one area of the environment; and
generate a security event alert in the dashboard.

5. The apparatus of claim 1, wherein the processor is further configured to:
receive notification of a security event that is detected in the area associated with the first camera; and
generate a security event alert in the first camera window.

6. The apparatus of claim 5, wherein the processor is further configured to:
determine that a security event count in the area associated with the first camera exceeds a threshold security event count; and
adjust an appearance of the first camera window in a heat map view of the graphical user interface such that a first visual representation of the heat map view for the first camera window is different than a second visual representation of the heat map view for other camera windows of the graphical user interface.

7. The apparatus of claim 1, wherein the processor is further configured to:
generate a layout graphical user interface associated with the graphical user interface, wherein the layout graphical user interface includes a representation of one or more areas of the environment, the layout graphical user interface including a plurality of camera icons each corresponding to one of the plurality of cameras, each of the plurality of camera icons having a respective position on the layout graphical user interface corresponding to a respective area in the environment associated with a corresponding one of the plurality of cameras;
receive notification of a security event that is detected in a respective one of the one or more areas of the environment;
determine that a security event count of the security event in the respective one of the one or more areas of the environment exceeds a threshold security event count; and
generate a heat map representation in the respective one of the one or more areas of the environment in the layout graphical user interface.

8. The apparatus of claim 1, wherein to generate the graphical user interface the processor is further configured to generate security event information in at least one respective camera window, the security information associated with a respective area in the environment associated with the respective camera window.

9. The apparatus of claim 8, wherein the security event information comprises, for a given area, one or any combination of: an occupancy count, an occupancy indicator, a security personnel indicator, a security alert indicator, a security event history, a device count, or a device status list.

10. The apparatus of claim 1, wherein the graphical user interface is spatially variable relative to a user device in the environment presenting the dashboard based on location information and direction information associated with the user device.

11. The apparatus of claim 1, wherein the processor is further configured to present, on a display device, the dashboard.

12. A method for controlling multi-camera view user interface, comprising:
generating, for a graphical user interface, a respective camera window for each respective camera of a plurality of cameras in different areas of an environment, wherein the respective camera window outputs a stream captured by the respective camera;
arranging the graphical user interface according to a camera window placement scheme based on a layout of the environment, wherein arranging the graphical user interface comprises:
assigning a first camera window of a first camera of the plurality of cameras a position on the graphical user interface relative to other generated camera windows based on a physical position of an area in the environment associated with the first camera relative to other areas in the environment; and
setting a window size of the first camera window based on an area size of the area associated with the first camera; and
generating, for display, a dashboard comprising the graphical user interface organized according to the camera window placement scheme.

13. The method of claim 12, wherein a respective window size and a respective window position of each respective camera window is proportional to a respective area size and a respective area position of each area in the environment corresponding to each of the plurality of cameras.

14. The method of claim 12, wherein arranging the graphical user interface according to the camera window placement scheme further comprises:
setting a window size of each camera window based on an object size of an object captured by the plurality of cameras such that the object size of the object is equal across each respective camera window of the graphical user interface.

15. The method of claim 12, further comprising:
receiving notification of a security event that is detected in at least one area of the environment; and
generating a security event alert in the dashboard.

16. The method of claim 12, further comprising:
receiving notification of a security event that is detected in the area associated with the first camera; and
generating a security event alert in the first camera window.

17. The method of claim 16, further comprising:
determining that a security event count in the area associated with the first camera exceeds a threshold security event count; and
adjusting an appearance of the first camera window in a heat map view of the graphical user interface such that a first visual representation of the heat map view for the first camera window is different than a second visual representation of the heat map view for other camera windows of the graphical user interface.

18. The method of claim 12, further comprising:
generating a layout graphical user interface associated with the graphical user interface, wherein the layout graphical user interface includes a representation of one or more areas of the environment, the layout graphical user interface including a plurality of camera icons each corresponding to one of the plurality of cameras, each of the plurality of camera icons having a respective position on the layout graphical user interface corresponding to a respective area in the environment associated with a corresponding one of the plurality of cameras;

receiving notification of a security event that is detected in a respective one of the one or more areas of the environment;

determining that a security event count of the security event in the respective one of the one or more areas of the environment exceeds a threshold security event count; and generating a heat map representation in the respective one of the one or more areas of the environment in the layout graphical user interface.

19. The method of claim 12, wherein generating the graphical user interface further comprises generating security event information in at least one respective camera window, the security information associated with a respective area in the environment associated with the respective camera window.

20. The method of claim 19, wherein the security event information comprises, for a given area, one or any combination of: an occupancy count, an occupancy indicator, a security personnel indicator, a security alert indicator, a security event history, a device count, or a device status list.

21. The method of claim 12, wherein arranging the graphical user interface according to the camera window placement scheme is spatially variable relative to a user device in the environment presenting the dashboard based on location information and direction information associated with the user device.

22. The method of claim 12, further comprising presenting, on a display device, the dashboard.

* * * * *